July 10, 1928.  1,676,487
H. D. GEYER
HORN BUTTON MOUNTING FOR STEERING WHEELS
Filed Dec. 19, 1924  2 Sheets-Sheet 1

Inventor
Harvey D Geyer

By Spencer Sewall & Hardman
his Attorneys

July 10, 1928.

H. D. GEYER 1,676,487

HORN BUTTON MOUNTING FOR STEERING WHEELS

Filed Dec. 19, 1924    2 Sheets-Sheet 2

Inventor
Harvey D. Geyer
By Spencer Sewall & Hardman
his Attorneys

Patented July 10, 1928.

1,676,487

UNITED STATES PATENT OFFICE.

HARVEY D. GEYER, OF DAYTON, OHIO, ASSIGNOR TO THE INLAND MANUFACTURING COMPANY, OF DAYTON, OHIO, A CORPORATION OF DELAWARE.

HORN-BUTTON MOUNTING FOR STEERING WHEELS.

Application filed December 19, 1924. Serial No. 757,067.

This invention relates to electrical switch buttons and means for mounting the same upon an automobile steering wheel or similar devices.

An object of this invention is to provide an improved form of horn button mounting means which is more economical to manufacture and assemble upon the steering wheel than those used at present.

Another object is to provide such a horn button which is retained in place by the threaded nut ordinarily used for retaining the handwheel upon the shaft.

Further objects and advantages of the present invention will be apparent from the following description, reference being had to the accompanying drawings, wherein a preferred form of embodiment of the present invention is clearly shown.

In the drawings.

In the drawings similar reference characters refer to similar parts throughout the several views.

Figure 1:
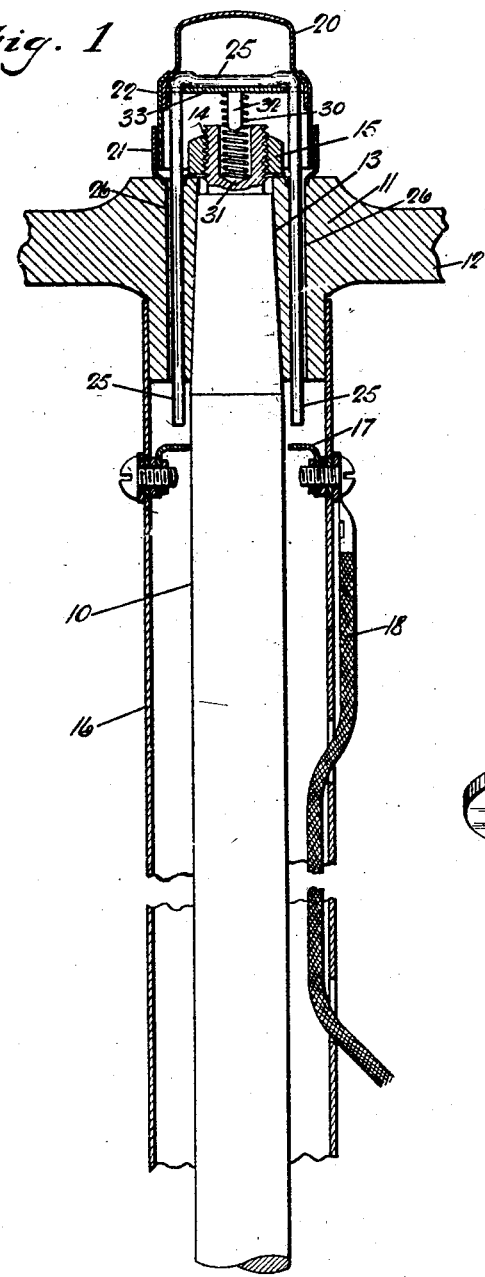
Fig. 1 is a vertical section through the central portion of an automobile steering wheel, horn button, and shaft and shows one embodiment of this invention.
Figure 4:
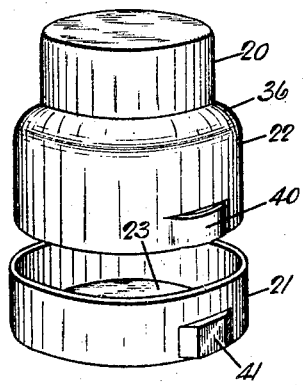
Fig. 4 is a perspective view showing the upper and lower telescoping sections of the horn button casing detached from one another.
Figure 5:
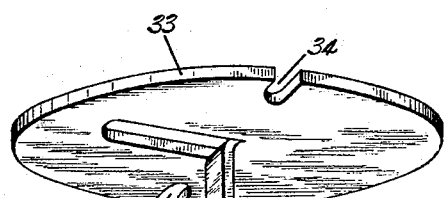
Fig. 5 is an enlarged perspective view of a detail.
Figure 3:
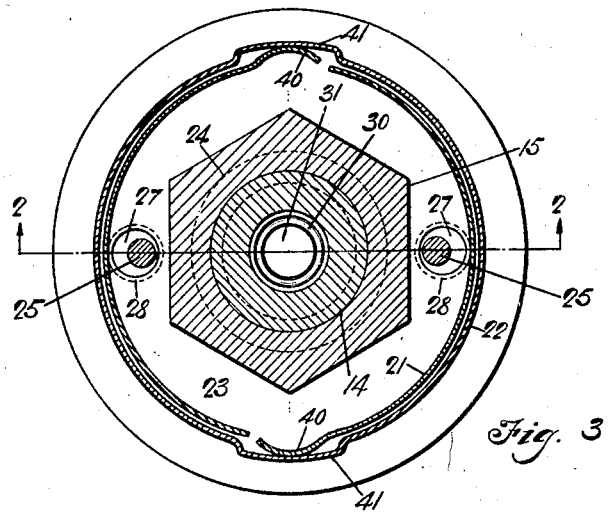
Fig. 3 is a section taken on line 3—3 of Fig. 2.
Figure 2:
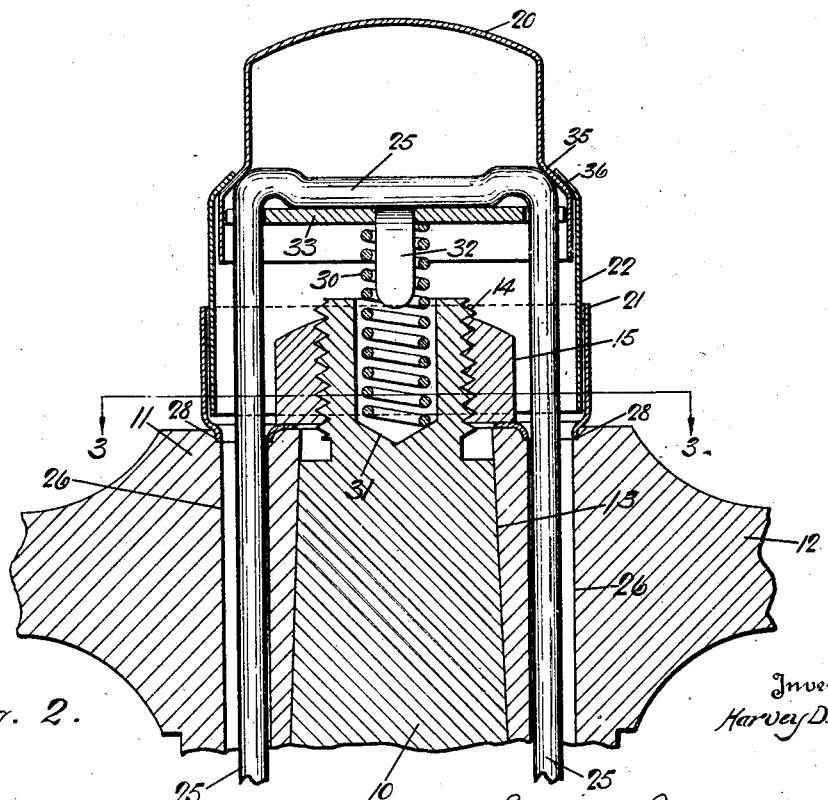
Fig. 2 is a section similar to that of Fig. 1 but on an enlarged scale and is taken on line 2—2 of Fig. 3.

Numeral 10 designates an automobile steering shaft having the hub 11 of the steering wheel 12 keyed or otherwise suitably fixed upon the tapered end 13 of the shaft. A nut 15 threaded upon the upper reduced portion 14 of shaft 10 is used during assembly to force the hub 11 home upon the tapered portion 13 and thereafter holds the hub 11 against axial removal from the shaft. 16 is a stationary tubular housing for the shaft 10, the lower end of hub 11 having a bearing within the upper end of the housing 16 as clearly shown in Fig. 1. A stationary contact ring 17 is insulatedly mounted within the housing 16 a short distance below hub 11 and closely adjacent to but out of contact with the shaft 10. The insulated electrical conductor 18 connects contact ring 17 with the automobile horn or similar device. The parts so far described are well known in the art. This invention relates to the improved horn button mounting, which horn button is used to ground the contact ring 17 and thus establish electrical circuit through the automobile horn. The stationary casing for the vertically reciprocatable horn button 20 comprises a lower section 21 and an upper section 22 which telescopes snugly within the lower section, as clearly shown in Fig. 2. This lower section 21 is cup-shaped and the bottom portion 23 thereof is provided with a central aperture 24 through which the threaded end 14 of shaft 10 may be inserted. The nut 15 is screwed down tightly against the bottom portion 23 thus clamping it against the upper surface of the hub 11 (as clearly shown in Fig. 2) whereby the section 21 is rigidly held fixed in position. The hub 11 is provided with two apertures 26 through which the U-shaped member or "hairpin" 25 is vertically reciprocatable to make and break electrical contact with the contact ring 17. The bottom 23 of the section 21 is also provided with two apertures 27 which register with the holes 26 and so permit the passage of the hairpin plungers. Preferably the apertures 27 are so punched out of the bottom 23 that the small circular flanges 28 are formed from the metal thereof. These small flanges 28 fit within the upper slightly enlarged end of apertures 26 and so maintain the proper registering of the holes 27 and 26 during the assembling of section 21 upon the wheel.

The hairpin 25 is urged upwardly by the small coil spring 30 whose lower end lies in the recess 31 in the shaft 10 and whose upper end is held aligned by the lug 32 depending from the disk 33. This disk 33 is provided with two diametrically opposed recesses 34 through which the plungers of hairpin 25 pass, as clearly illustrated.

The upward pressure of spring 30 holds disk 33 and hairpin 25 pressed against the under side of the shoulder 35 of the cup-shaped horn button 20. The horn button 20 is limited in its upward movement by the upper side of the shoulder 35 engaging the inturned flange 36 of the upper section 22 of the stationary casing. The upper section 22 is quick-detachably held down within the lower section 21 by means of the two yieldable projections 40 which spring out into the depressions 41 pressed in the metal of the lower section 21. In order to remove the upper section 22 it is only necessary to rotate it within section 21 until the spring projections 40 are cammed out of the depressions 41 after which the section 22 may be slipped out of its telescoped position.

It will be obvious that in assembling the mechanism the lower section 21 is first secured in place upon the hub 11 and the nut 15 screwed down by means of a socket wrench. The spring 30, disk 33, and hairpin 25 are then set in their proper positions as shown. The upper section 22 with the horn button 20 in place is then set down over the hairpin 25 and section 22 is pressed down into its telescoped position with section 21 and rotated until the spring lugs 40 snap into place in the recesses 41.

An important feature of this invention is the double use of the nut 15 for holding the steering wheel upon the shaft 10 and for holding the horn button casing upon the steering wheel hub. Thus the means for retaining the horn button casing in place is entirely concealed and hence the wheel and horn button will present a neater outside appearance than would otherwise be the case.

While the form of embodiment of the present invention as herein disclosed, constitutes a preferred form, it is to be understood that other forms might be adopted, all coming within the scope of the claims which follow.

What I claim is as follows:

1. In combination, a steering shaft, a handwheel fixed upon said shaft, a nut threaded upon the shaft to hold said handwheel against axial movement thereupon, a horn button guide casing mounted upon the top of the handwheel and completely enclosing said nut and having a portion extending under said nut whereby said casing is retained in place, and a horn button reciprocative within said guide casing.

2. In combination, a shaft, a wheel fixed upon said shaft, a nut threaded upon said shaft to hold said wheel against axial movement thereupon, a cylindrical switch button guide casing mounted upon the top surface of said wheel and enclosing said nut, said casing having a portion clamped under said nut whereby said casing is retained in place, and a switch button telescopable within said casing.

3. In combination, a shaft, a wheel fixed upon said shaft, a nut threaded upon said shaft to hold said wheel against axial movement thereupon, a switch button casing mounted directly upon said wheel and enclosing said nut, said casing having detachable upper and lower portions, the lower portion being held clamped under said nut and being open at the top to permit access to said nut whereby said nut may be screwed home when said upper portion is detached, and means for attaching said upper portion of the casing to the lower portion after said nut is screwed home.

In testimony whereof I hereto affix my signature.

HARVEY D. GEYER.